United States Patent [19]

del Castillo

[11] 4,061,072

[45] Dec. 6, 1977

[54] DEVICE TO IDENTIFY CHORDS ON A KEYBOARD INSTRUMENT AND KEY MECHANISM FOR USE THEREWITH

[76] Inventor: Juan M. del Castillo, Risco 119, Mexico 20, D. F., Mexico

[21] Appl. No.: 656,881

[22] Filed: Feb. 10, 1976

[51] Int. Cl.² .......................................... G09B 15/02
[52] U.S. Cl. ................................ 84/478; 74/483 PB; 200/5 E
[58] Field of Search ...................... 84/470, 477 R, 478, 84/479, 485

[56] References Cited

U.S. PATENT DOCUMENTS

| | | |
|---|---|---|
| 2,820,391 | 1/1958 | Janssen et al. ..................... 84/478 X |
| 3,335,630 | 8/1967 | Schmoyer ............................. 84/478 |
| 3,415,152 | 12/1968 | Gullickson ........................... 84/478 |
| 3,958,487 | 5/1976 | Goldman ............................. 84/478 |

Primary Examiner—Lawrence R. Franklin
Attorney, Agent, or Firm—Karl W. Flocks

[57] ABSTRACT

Operation of a pushbutton or key mechanism by the operation of a single pushbutton or key through circuitry which may include fiber optics signals all keys on the keyboard included in the particular chord. The device may be built in or simply attached to the keyboard instrument. The keys are spring, and string or wire operated to return a key to its inoperative position when the next key is pressed down.

14 Claims, 9 Drawing Figures

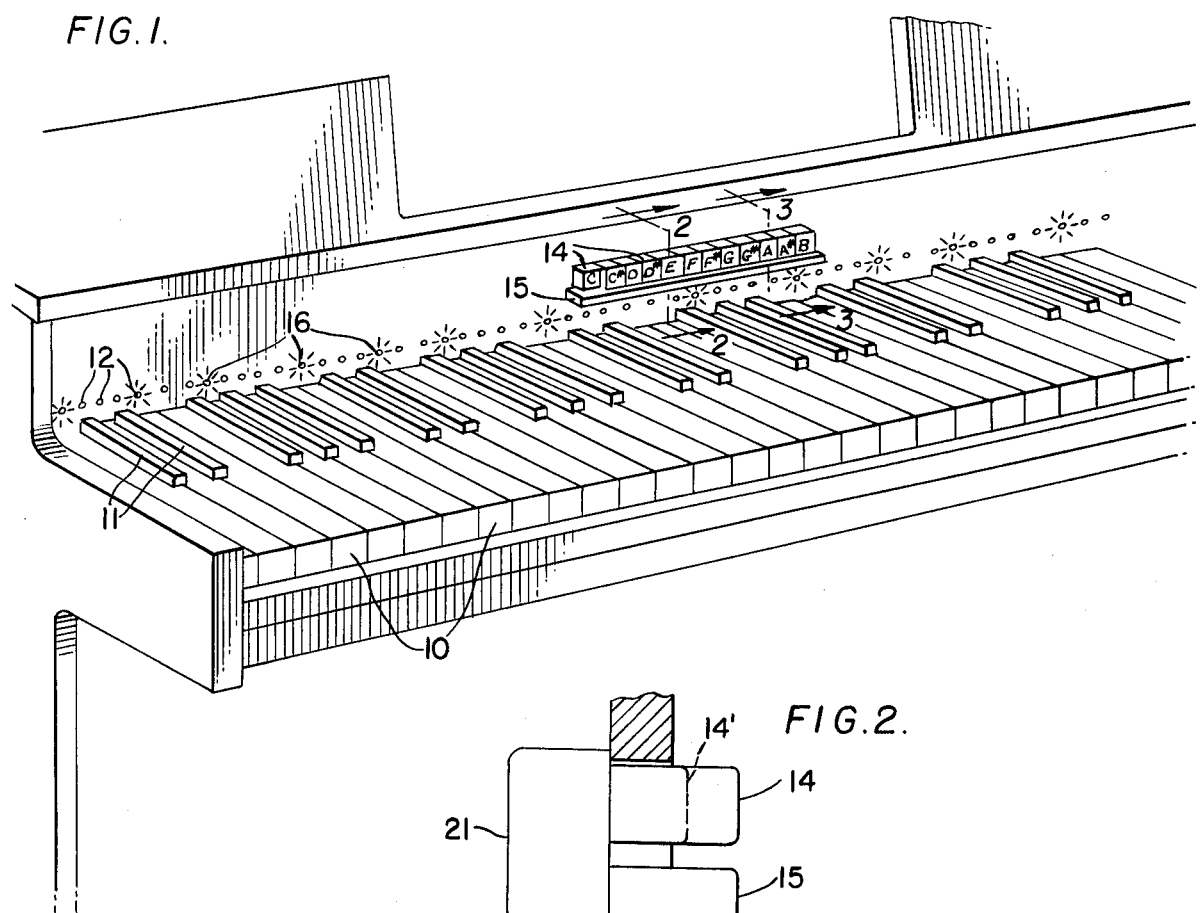
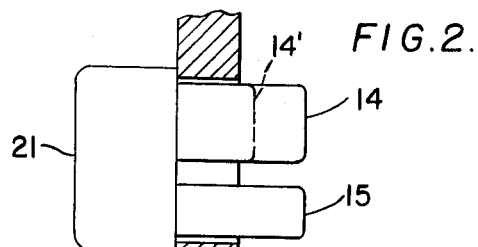
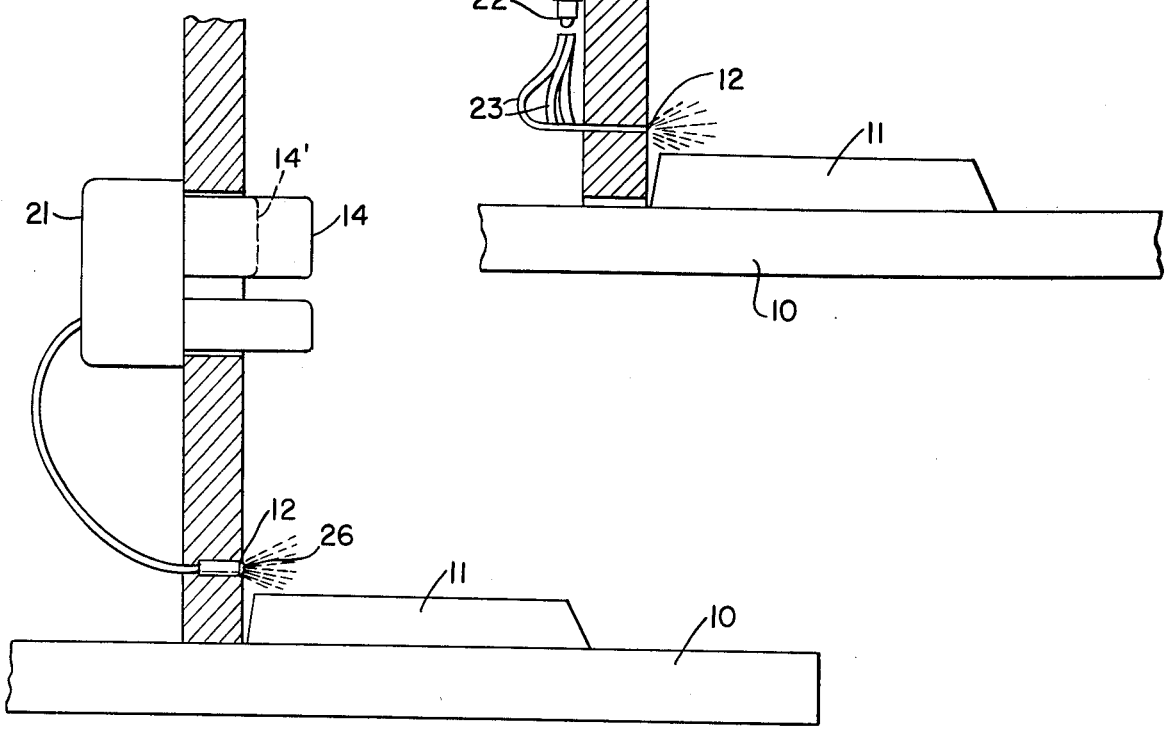

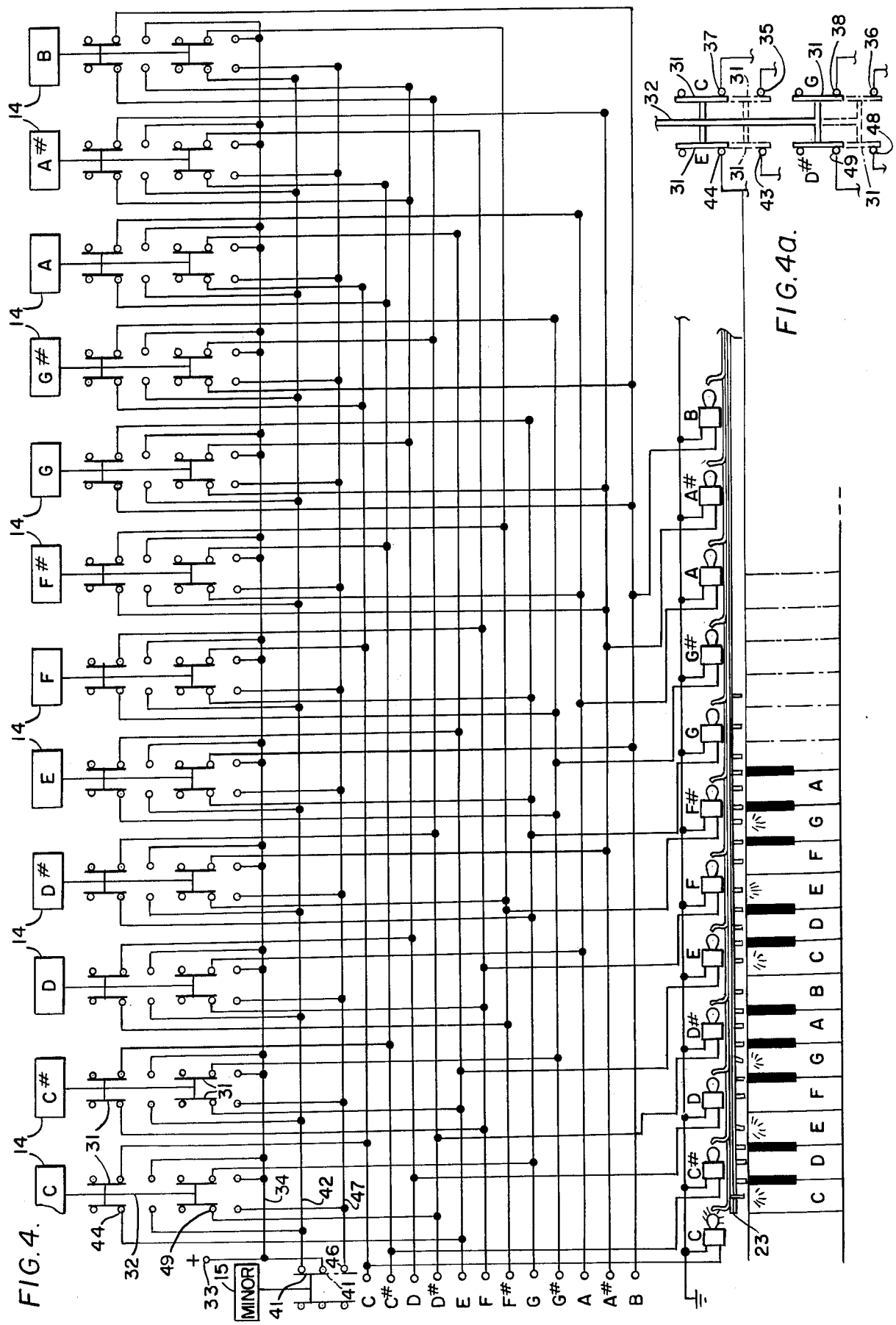

DEVICE TO IDENTIFY CHORDS ON A KEYBOARD INSTRUMENT AND KEY MECHANISM FOR USE THEREWITH

BACKGROUND OF THE INVENTION

This invention relates to a chord indicating device and more particularly to one which is used to indicate the proper combination of keys to be depressed in each of the octaves of a keyboard instrument such as a piano or an organ.

In learning to play the piano or organ or other type of keyboard instrument a knowledge of the keys constituting each chord must be learned. A device as in the present case aids in the easy identification of the keys to be played for each chord during the learning of these chords.

SUMMARY OF THE INVENTION

The present invention is a device for identifying chords, either built-in or simply attached on to a musical instrument, having pushbuttons or keys marked with symbols indicating chords.

An additional pushbutton or key, through connecting circuitry allows the designation of minor chords as well as the designation of major chords.

A key mechanism used in the device of the present invention includes spring and string or wire to return a key to the inoperative position upon pressing of another key.

The electronic circuitry of the present invention is simplified by use of fiber optics connected thereto.

BRIEF DESCRIPTION OF THE DRAWINGS

The invention will be described in detail in connection with the accompanying drawings in which:

FIG. 1 is a partial perspective view of a piano keyboard with the chord indicating device of the present invention built into the piano structure;

FIG. 2 is an enlarged partial sectional view along line 2—2 of FIG. 1;

FIG. 3 is an enlarged partial sectional view along line 3—3 of FIG. 1 showing an alternate embodiment of the present invention;

FIG. 4 is a circuit diagram of the electrical system of the present invention using parts shown in FIG. 2;

FIG. 4a is an enlarged diagrammatic showing of the pushbutton switches of FIG. 4;

DESCRIPTION OF THE PREFERRED EMBODIMENTS

Figure 5:
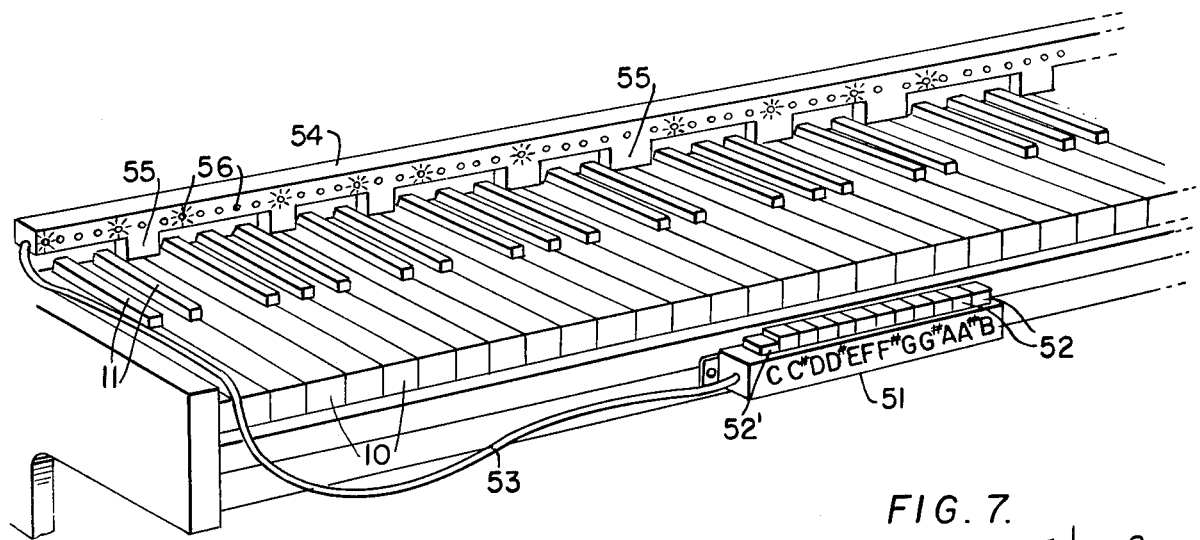
FIG. 5 is a partial perspective view of a piano keyboard with a chord indicating device of the present invention as a portable or add-on device not built into the piano.

Referring first to the partial perspective of a piano keyboard with the device of the present invention built into the piano there is shown the regular white keys 10 and black keys 11 having an opening 12 through which a light can shine, above and just over each of keys 10 and 11. Mounted above the keys 10 and 11 in a convenient position as shown or below and in front of the keys if such is convenient (not shown) are 12 pushbuttons 14, each marked with a symbol of one of the chords. A pushbar 15 mounted below pushbuttons 14 is pressed to designate a minor chord. In the illustration in FIG. 1, pushbutton 14 for the C Major chord has been pushed in as shown causing a light 16 to shine over each of the C, E, and G keys 10 along the whole piano keyboard allowing a person playing the piano to choose and play the chord in the octave chosen.

Two possible embodiments of the built-in pushbutton, pushbar, and lighting systems are shown in FIGS. 2 and 3. In the embodiment of FIG. 2 which is the preferred embodiment used with the electronic system of FIG. 4, pushbutton 14, with pushbar 15 are shown mounted from box 21 which contains the circuitry of FIG. 4. A lamp 22 activated by pressing pushbutton 14 to the dashed inward position 14[1] lights and by its position at the ends of fiber optics 23 transmits light along all the fibers 23 so that light is emitted from the opposite ends of the fibers at openings 12 over keys 10 and 11 in accordance with the chord being identified. Similarly FIG. 3 has circuitry which is activated when pushbutton 14 is moved to the dashed position 14[1] which closes a switch in box 21 and causes a lamp 26 to light up at the openings 12 over keys 10 and 11 also in accordance with the chord being identified. This latter embodiment requires a lamp for each key on the keyboard instead of the twelve lamps of the embodiment of FIG. 2 with wiring used instead of fiber optics.

Using the fiber optic embodiment of FIG. 2, the circuitry of FIG. 4 will operate to identify the chords. When any of pushbuttons 14 is depressed the contactors 31 having an H shape with a stem 32 connecting the centers of a pair of H's is moved downward as illustrated by dashed lines in FIG. 4a. The illustration is for the pressing of the pushbutton 14 marked for a C chord. In the up position or inoperative position of FIGS. 4 and 4a all circuits remain open. When the H's are moved downward to the dashed position of FIG. 4a contacts are closed completing circuits from a positive voltage source 33 along line 34 to contacts 35 and 36 through contactors 31, and contacts 37 and 38 respectively, to the respective C and G lines to the C and G lamps respectively and then to ground.

The connection from voltage source 33 is also made through contactor 41 connected to the MINOR pushbar 15 shown in an inoperative position in full lines. This connection is continued through line 42 and through contacts 43 and 44 connected by contactor 31 to an E line and then through E lamp to ground. With C, E, and G lamps lit the light travels through fiber optics 23 to the ends of those fibers in openings 12 over the respective C, E, and G keys of each octave along the whole keyboard.

If it is desired to designate the minor chord of C then pushbar 15 is depressed and contactor 41 moves downward to the dashed position shown wherein the positive voltage source 33 is now connected to contact 46 and line 47 which completes a circuit through contacts 48 and 49 connected by contactor 31, on to the D# line and D# lamp to ground. Fiber optics 23 from D# lamp carry light to all openings 12 over all D# keys 11 on the keyboard. Operation of each of the other pushbuttons 14, with or without operation of pushbar 15 can be similarly traced through the circuit of FIG. 4 to result in the appropriate identification of the keys pertaining to each of the chords, major and minor, for each of the marked pushbuttons 14.

FIG. 5 illustrates a chord identifying device operating in a manner similar to the device of FIG. 1 except that instead of being built into the piano, this device is easily mounted externally and easily removed. The pushbutton unit 51 which has a pushbutton 52 for each designated chord is shown without a MINOR pushbar which may be incorporated therein. This may be mounted by screw or similar means to the piano front. Unit 51 is electrically connected through cable 53 to lighting unit 54 which stands on legs 55 on white keys 10 in spaces between black keys 11, and thus is readily removable. The lighting at openings 56 designates the keys for the C Major chord for which pushbutton $52^1$ is depressed.

Figure 6:
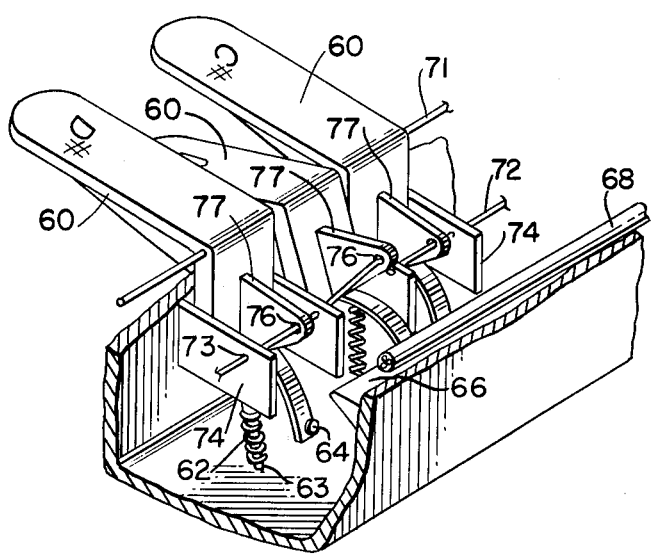
FIG. 6 is a partial perspective of an embodiment of the chord circuit activation mechanism using a key mechanism.
Figure 7:
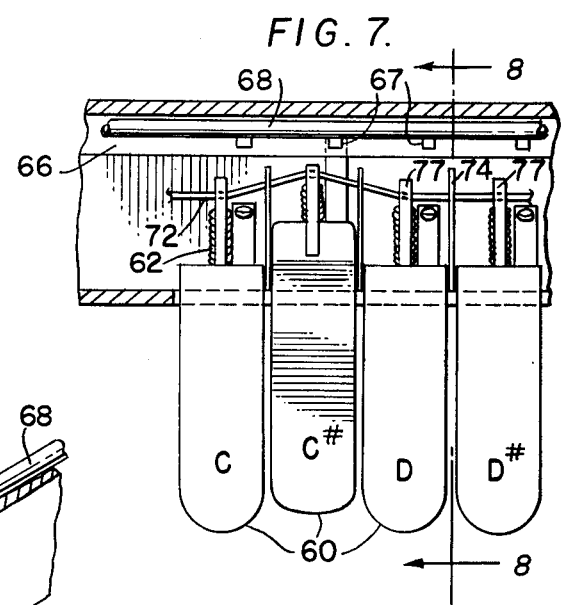
FIG. 7 is a partial top plan view of the key mechanism of FIG. 6.
Figure 8:
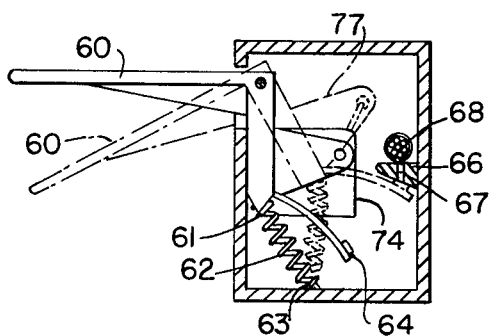
FIG. 8 is a partial sectional view along line 8—8 of FIG. 7 with the key shown in an operative position in dashed outline.

Instead of pushbuttons 14 or 52 the chord identification device may be operated by a key mechanism as illustrated in FIGS. 6-8. Each of the keys 60 is marked similarly to the pushbuttons by a symbol of each of the chords. Each of keys 60 has a boss 61 on its bottom projecting downward encircled by the end of a compression spring 62, which encircles with its other end a boss 63 on the bottom of the unit and projecting upward. This causes a toggle action of key or lever 60. An electrical contactor 64 is spring mounted and connected to key 60 at the lower end of the key. Contactor 64 extends in a manner so as to be raised up against wire support shelf 66 as shown in dashed outline in FIG. 8 and in conjunction with key 60 marked C# in FIGS. 6 and 7. Each of the offshoots 67 of cable 68, if just considering major chords, would contain four wires so that a wire from a positive voltage source may be connected through contactor 64 to the lights for the notes designating that chord as with the prior illustrations, and then to a ground.

In order to cause the return of a key 60, once pressed, to its normal up position upon depression of another key 60 the keys are connected to pivot on a bar 71 extending along the pivot axis of all the keys 60. A single taut string or wire 72 is passed through holes 73 in horizontal projections 74 extending from the key side of the key mechanism holder on each side of keys 60 and through holes 76 in ears 77 extending from each key 60 between projections 74.

When a key is pressed compression spring 62 is moved past a center position where it passes through a condition of maximum compression and afterward helps to continue the downward movement of the pressed key 10. The electrical contactor 64 moves upward into contact with the wire ends from cable 68 extending through offshoot 67 through the support shelf 66. Compression spring 62 maintains key 60 in the depressed position as shown in dashed outline in FIG. 8. When another key 60 is depressed the wire or string 72 is made so taut that the tendency to straighten at its connection to the previously depressed key is so great as to overcome the force of spring 62 which passes by its point of maximum compression and then aids the work of wire or string 72 by its expansion to raise key 60 to the inoperative position.

It will be obvious to those skilled in the art that various changes may be made without departing from the scope of the invention and the invention is not to be considered limited to what is shown in the drawings and described in the specification.

What is claimed is:

1. A device for identifying chords on a keyboard musical instrument comprising
   chord selection means including a plurality of operators having indicia associated therewith designating the chord names to be identified;
   lighting means including lamp means and fiber optic means, said lamp means including a lamp for each note of said chords, said fiber optic means including a plurality of fiber optics for each of said lamps, one end of said plurality of fiber optics for each of said lamps being located adjacent that said lamp and the other end of said plurality of fiber optics having individual ends of each of said fiber optics positioned adjacent a key of the keyboard in each of a plurality of octaves, having the same note name assigned to said lamp located at the opposite end of that said fiber optic;
   and electrical means responsive to actuation of each of said operators to light said lamps for notes comprising the chord designated by the chord name associated with each said operator.

2. The device for identifying chords in accordance with claim 1, wherein said chords are major chords and said chord names are the root notes of said major chords.

3. The device for identifying chords in accordance with claim 1 wherein
   said indicia comprise the notes of a chromatic scale.

4. The device for identifying chords in accordance with claim 1, further characterized by
   said operators each being a pushbutton having a stem and a pair of H shaped contactors connected to said stem, each of the vertical portions of said H shaped contactors locatable for bridging a pair of contacts, one of which is connected to a power source and the other of which is connected to one of said lamps.

5. The device for identifying chords in accordance with claim 4, further characterized by
   three of said vertical portions of said pair of H shaped contactors completing circuits to three different ones of said lamps,
   an operator means to designate a minor chord movable to disconnect one of said three vertical portions and connect a fourth vertical portion of said pair of H shaped contactors between a power source and one of said lamps.

6. The device for identifying chords in accordance with claim 1, further characterized by
   said chord selection means mounted externally on the keyboard instrument,
   said individual ends of each of said fiber optics extending through openings of a structure having legs resting on the keys of the keyboard instrument.

7. The device for identifying chords in accordance with claim 1, further characterized by
   said chord selection means being a key operated mechanism.

8. The device for identifying chords in accordance with claim 7, further characterized by
   said key operated mechanism including
   a plurality of keys with a key for each of the chords to be identified,
   electrical contactor means connected to each key and positioned to close circuitry upon depression of said key,
   compression spring means connected to each of said keys single string means connecting said plurality of keys to operate to return said key that has been depressed to its original undepressed position.

9. The device for identifying chords in accordance with claim 8, further characterized by said plurality of keys mounted on the same pivot axis.

10. The device for identifying chords in accordance with claim 8, further characterized by said compression spring means connected to said key to pass through a point of maximum compression at an intermediate point between positions of said key between its original undepressed position and depressed position.

11. The device for identifying chords in accordance with claim 8, further characterized by said single string means including a single taut string passing through a portion of each of said keys at a point on the opposite side of a common pivot axis of said plurality of keys from the portion of said key which is adapted for being depressed.

12. The device for identifying chords in accordance with claim 8, further characterized by said electrical contactor means including a spring mounted contact.

13. The device for identifying chords in accordance with claim 1 further including an operator means for changing said electrical means to a mode for identifying minor chords, said chord names being identified as the root notes of said minor chords.

14. The device for identifying chords in accordance with claim 13, further characterized by said operator means having an H shaped contactor.

* * * * *